United States Patent [19]

Baumann et al.

[11] Patent Number: 4,727,753
[45] Date of Patent: Mar. 1, 1988

[54] ARRANGEMENT FOR MONITORING PRESSURE PULSES IN GAS/PARTICULATE MATERIAL MEDIA FLOWING THROUGH PIPELINES AND/OR CONTAINERS

[75] Inventors: Hans-Richard Baumann, Essen-Bredeney; Gerhard Winkler, Essen, both of Fed. Rep. of Germany

[73] Assignee: Krupp-Koppers GmbH, Essen, Fed. Rep. of Germany

[21] Appl. No.: 825,097

[22] Filed: Jan. 31, 1986

[30] Foreign Application Priority Data

Feb. 13, 1985 [DE] Fed. Rep. of Germany ....... 3504870

[51] Int. Cl.$^4$ .............................................. G01L 7/00
[52] U.S. Cl. .................................... 73/706; 73/756; 73/861.63
[58] Field of Search ................ 73/756, 861.63, 861.52, 73/861.42, 706, 716

[56] References Cited

U.S. PATENT DOCUMENTS 4,480,947 11/1984 Nagasaka ...................... 73/861.52
4,507,971 3/1985 Vachek .............................. 73/756

Primary Examiner—Donald O. Woodiel
Attorney, Agent, or Firm—Michael J. Striker

[57] ABSTRACT

An arrangement for monitoring pressure pulses in gas/particulate material media flowing through pipelines and/or containers includes an annular metallic housing which surrounds a flow passage and has in its interior an annular chamber which extends around the flow passage and is separated therefrom by a barrier layer of a wear resistant and porous material. Connecting ports for connecting the annular chamber respectively to a pulse conduit leading to a pressure measuring device and to a source of a rinsing gas open into the annular chamber.

6 Claims, 5 Drawing Figures

ARRANGEMENT FOR MONITORING PRESSURE PULSES IN GAS/PARTICULATE MATERIAL MEDIA FLOWING THROUGH PIPELINES AND/OR CONTAINERS

BACKGROUND OF THE INVENTION

The present invention relates to pressure monitoring arrangements in general, and more particularly to an arrangement for monitoring pressure pulses in the flow of a gas/particulate material medium through a pipeline or a container.

A multitude of problems is constantly encountered during the taking of pressure pulses for the purpose of pressure measurement and/or differential pressure measurement in pipelines and/or containers through which gases which are heavily loaded with dust or other particulate material, or in which a finely granular dust is loosened or suspended by a carrier or entrainment gas and maintained under pressure or pneumatically conveyed. The encountered difficulties are predominantly such which come into being because of the deposition of dust on the measuring surfaces of the measuring instruments or devices, in the pressure measuring chambers themselves, or in the pulse conduits between the dust-conveying pipeline and/or the container and the pressure measuring instrument. As a result of the deposition of dust in the pulse conduits, the pressure measuring instruments connected to the remote ends of such conduits can be often put out of the operation after a relatively short period of time.

A measurement problem of this kind, wherein the aforementioned difficulties can be encountered, exists in practice, for instance, during the measuring and supervision of the mass stream or flow of a finely granular to pulverulent solid fuel which is pneumatically conveyed by means of a carrier gas from a storage bin or container into a gasification arrangement wherein the solid particulate fuel is gasified by partial oxidation with oxygen. Herein, the solid fuel mass stream which is supplied through a pneumatic conduit to the gasification arrangement is supervised and controlled by means of a process computer, for instance, in accordance with one of the methods disclosed in the U.S. Pat. application Ser. No. 571,518, with the aid of a radiometric density measurement as well as a differential pressure measurement in a Venturi tube. However, an arrangement of this type exhibits a considerable amount of down-time because of the clogging problem mentioned above.

SUMMARY OF THE INVENTION

Accordingly, it is a general object of the present invention to avoid the disadvantages of the prior art.

More particularly, it is an object of the present invention to provide an arrangement for monitoring the pressure of gaseous media carrying particulate materials, which arrangement does not possess the disadvantages of the known arrangements of this kind.

Still another object of the present invention is so to construct the arrangement of the type here under consideration as to avoid the clogging-related problems mentioned above.

It is yet another object of the present invention to develop an arrangement of the above type which gives reliable and substantially contemporaneous indications of the actual pressure conditions in the flow of the aforementioned gaseous media.

A concomitant object of the present invention is so to construct the arrangement of the above type as to be relatively simple in construction, inexpensive to manufacture, easy to use, and reliable in operation nevertheless.

In pursuance of these objects and others which will become apparent hereafter, one feature of the present invention resides in an arrangement for monitoring the pressure prevailing in an enclosed space, such as a pipeline, a container, and the like, especially such space in which a flow of a gas/particulate material medium exists, comprising an annular metallic housing including a flow passage centered on an axis and an annular channel surrounding the flow passage, as well as two connecting ports for respectively communicating the annular chamber with a pulse conduit and a rinsing conduit; and a barrier layer of a wear-resistant porous material separating the annular chamber from the flow passage.

An important advantage of the arrangement of the present invention as described so far is that it is excellently suited for use even under quite adverse operating conditions, that is, for example, when the medium being transported through the pipeline or in the container is heavily loaded with dust, when the temperature of the medium exceeds 100° C., and when the pressure of the medium is quite high.

The barrier layer may be of a sintered metal, a ceramic material, or a synthetic plastic material. The choice of the particular material used is determined, on the one hand, by the corrosion and the erosive loading of the barrier layer by the gas/particulate material medium stream to be measured under the encountered operating conditions and, on the other hand, with respect to the porosity, by the type of dust in the gas/particulate material medium being measured. Herein, the pores of the material are to be, in accordance with an aspect of the present invention, smaller in their cross sections than the average particle size of the dust in the gas/particulate material flow to be measured. A material which is particularly suited for the barrier layer is a sintered metal with a pore width between 1 and 10 um made of high-grade steel 1.4404 or Hastelloy. Herein, it may be advantageous under certain circumstances to additionally subject the sintered metal being used to surface treatment for improving its wear resistance. Another material well suited for the above purpose is a ceramic material on the basis of $Al_2O_3$ with a pore width between 1 and 30 um.

The novel features which are considered as characteristic of the invention are set forth in particular in the appended claims. The improved pressure monitoring arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
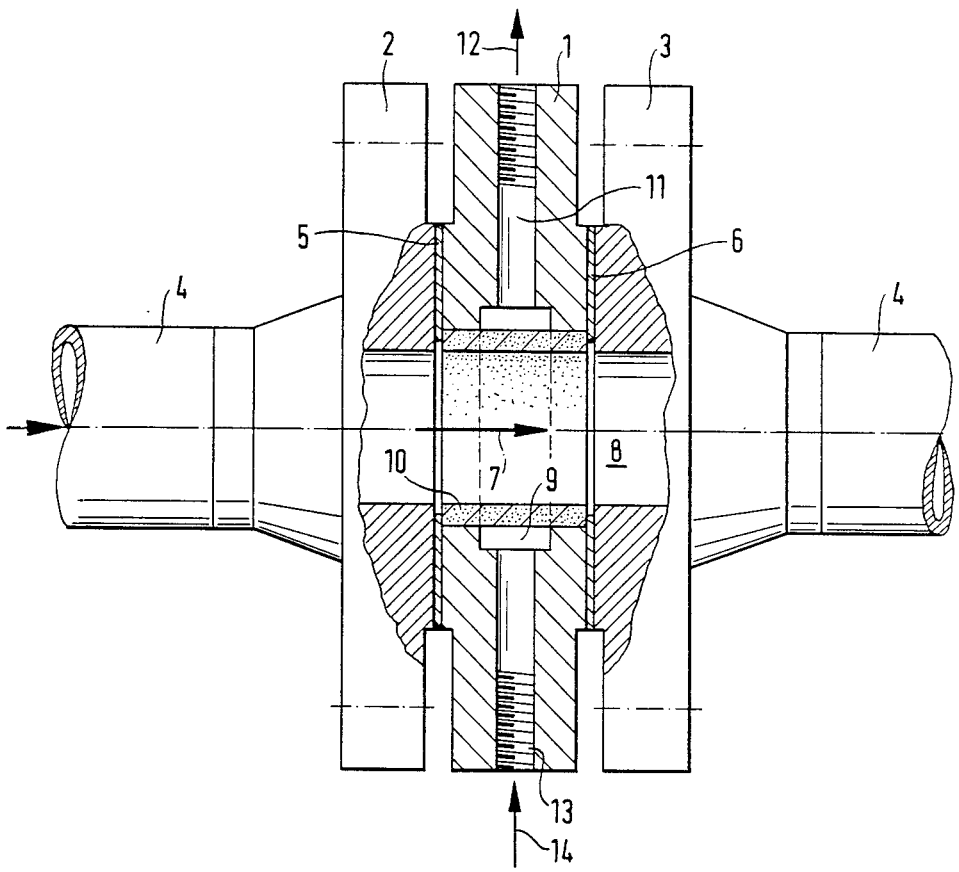
FIG. 1 is a partially sectioned side elevational view of the arrangement according to the present invention.

Referring now to the drawing in detail, and first to FIG. 1 thereof, it may be seen that the reference numeral 1 has been used therein to identify a disk-shaped metallic housing which is clamped between two flanges 2 and 3 of a pipeline 4. A gas/particulate material mixture or medium whose pressure and/or pressure pulses are to be detected flows through the pipeline 4 and thus through the interior of the metallic housing 1 in the direction indicated by an arrow. Two sealing rings 5 and 6 provide herein for the necessary sealing action between the metallic housing 1 and the respective flanges 2 and 3 of the pipeline 4. Herein, the quality of the material of the metallic housing 1 must be at least as good as that of the material of the flanges 2 and 3 of the pipeline 4, or better.

The metallic housing 1 includes a through passage 8 which is centered on a central axis of the metallic housing 1 which is indicated as a dash-dotted line at 7. The passage 8 preferably has a cylindrical shape with a circular cross section having a diameter corresponding to the inside diameter of the pipeline 4. The through passage 8 is outwardly surrounded over a part of its axial length by an annular chamber 9 and is separated from the annular chamber 9 by a barrier layer or element 10 which is made of a porous and wear-resistant material. As illustrated, the annular chamber 9 is provided in and preferably milled into the metallic housing 1, while the barrier layer 10 is constituted by a tubular sleeve which circumferentially surrounds the through passage 8 and is fittingly received in the interior of the metallic housing 1. The connection between the barrier layer 10 and the metallic housing 1 must be gap-free and gas impervious, and this can be achieved by resorting to measures which are in themselves well known, such as rolling, glueing or welding. As far as the selection of the material for the barrier layer 10 is concerned, reference is being made here to the disclosure of suitable materials presented earlier in this application. The barrier layer 10 provides a gas-permeable connection between the flow passage 8 and the annular chamber 9, while it simultaneously prevents penetration of dust and other particulate material contained in the medium flowing through the flow passage 8 into the annular chamber 9.

The annular chamber 9 is provided, by means of a corresponding bore provided in the metallic housing 1, with a connecting port 11 to a pulse conduit 12 which connects the arrangement of the present invention to a pressure measuring device or a differential pressure measuring device which is of any known and readily available construction and thus has not been depicted in the drawing. Herein, the pulse conduit 12 has been indicated, in order to simplify the drawing, only in the form of an arrow, the direction of the arrow indicating the direction of flow of the gas from the connecting port to the measuring device.

During the use of the arrangement as described so far, a gas pressure is established in the connecting port 11 and in the pulse conduit, this gas pressure corresponding to the gas pressure of the gas/particulate material mixture or medium flowing through the flow passage 8 and through the interior of the pipeline 4. As a result of the porosity of the barrier layer 10, a constant and continuing pressure equalization takes place between the gas/particulate material medium flow through the interior of the pipeline 4 and the flow passage 8, on the one hand, and the annular chamber 9 and thus the connecting port 11, the pulse conduit 12 and the non-illustrated measuring device.

It has been found to be advantageous to make the dimensions of the annular chamber 9 and of the pulse conduit 12 as small as possible, so as to keep the volume of the gas stream which is to be cleaned by the porous barrier layer 10 as low as possible or feasible.

Experience has shown that the flow speed of the gas/particulate material stream in the pipeline 4 is, under normal circumstances, so high that the flowing medium provides for a sufficient self-cleaning action of sorts at the side of the barrier layer 10 which comes into contact with the particulate material and prevents the formation of a filter cake on this side of the barrier layer 10. It has also been established that, to provide sufficient communication and gas flow between the flow passage 8 and the annular chamber 9, it is sufficient when only a few open pores are present in the barrier layer 10. Nevertheless, for the purpose of assuring maximum operational reliability, there is provided in the arrangement according to the present invention another connecting port 13, and a rinsing gas conduit 14 which communicates with or opens into the additional connecting port 13. Here again, once more for the sake of simplifying the depiction of the arrangement of the present invention in the drawing, the rinsing gas conduit 14 is represented merely by an arrow which simultaneously indicates the direction of flow of the rinsing gas. The admission of the rinsing gas into the annular chamber 9 can be herein made very small since, on the one hand, only a few of the pores in the barrier layer 10 need be rinsed clean by the rinsing gas stream to achieve the necessary pressure equalization and, on the other hand, the speed of the rinsing gas stream in the pulse conduit 12 does not constitute any limiting value which would have to be watched for the avoidance of the particulate material entry into the annular chamber 9. It has been particularly established by experiments with and practical use of arrangements constructed in accordance with the present invention that the admission of the rinsing gas into the annular chamber 9 is especially needed when the gas/particulate material stream to be monitored or measured includes wet and/or adhesive particles. However, even in this instance, there is needed a continuous or intermittent addition of the rinsing gas in an amount that merely constitutes less than 1% of the volume of the carrier or entraining gas in the gas/particulate material medium stream.

Figure 2:
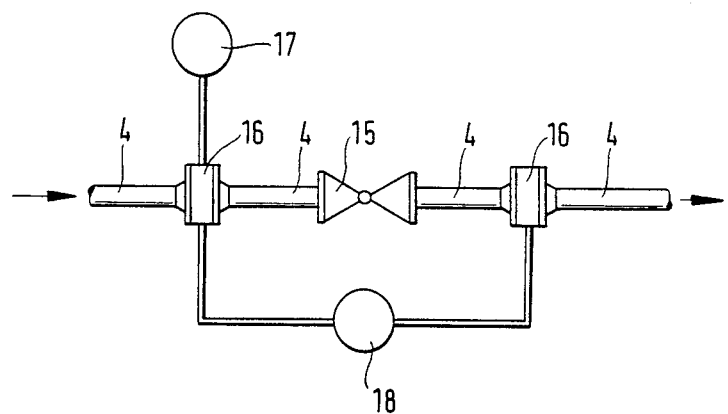
FIG. 2 is a somewhat simplified side elevational view of a regulating valve arrangement utilizing the arrangement of FIG. 1.
Figure 3:
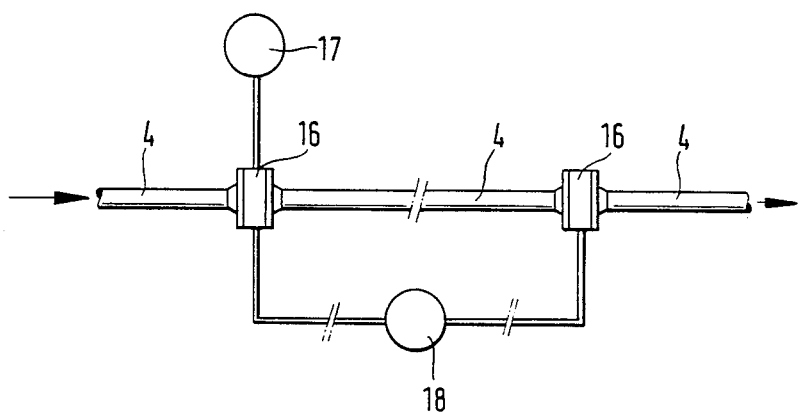
FIG. 3 is a view similar to FIG. 2 but showing a pipeline length instead of the valve arrangement.

The somewhat diagrammatic representations of FIGS. 2 and 3 depict possibilities of utilization of the arrangement according to the present invention as illustrated in FIG. 1 in conjunction with a regulating valve and with a straight pipeline length, respectively. What is involved in FIG. 2 of the drawing is a pressure and pressure differential measurement at a regulating valve 15 which is installed or interposed in the pipeline 4 through which the aforementioned gas/particulate material medium flows. Herein, one arrangement 16 constructed according to the present invention is arranged upstream, and another downstream, of the regulating valve 15, as considered in the direction of flow of the above-mentioned medium through the interior of the pipeline 4. The arrangement 16 which is arranged upstream of the regulating valve 15 is connected, via its pulse conduit 12, with a pressure measuring device 17 and also with a pressure differential measuring device 18, while the arrangement 16 which is arranged downstream of the regulating valve 15 is connected via its pulse conduit 12, only with the differential pressure measuring device 18. The differential pressure which is measured or detected by the differential pressure measuring device 18 can be utilized for the supervision or control of the flow of the gas/particulate material medium through the interior of the pipeline 4. Herein, the particulate material carried by the entraining gas through the interior of the pipeline 4 may be, for instance, finely granular to pulverulent coal. It has been established that a particular advantage of the application of the present invention in a circuit of this type resides in the fact that, in this case, the taking of the pressure pulses can occur without encountering any turbulences in the gas/particulate material medium flow. On the other hand, FIG. 3 illustrates a corresponding arrangement in which, however, no regulating valve such as 15 is interposed into the pipeline 4. Herein, the reference numerals used in conjunction with FIG. 3 designate the same or corresponding parts as the same reference numerals used in conjunction with FIG. 2 of the drawing.

Figure 4:
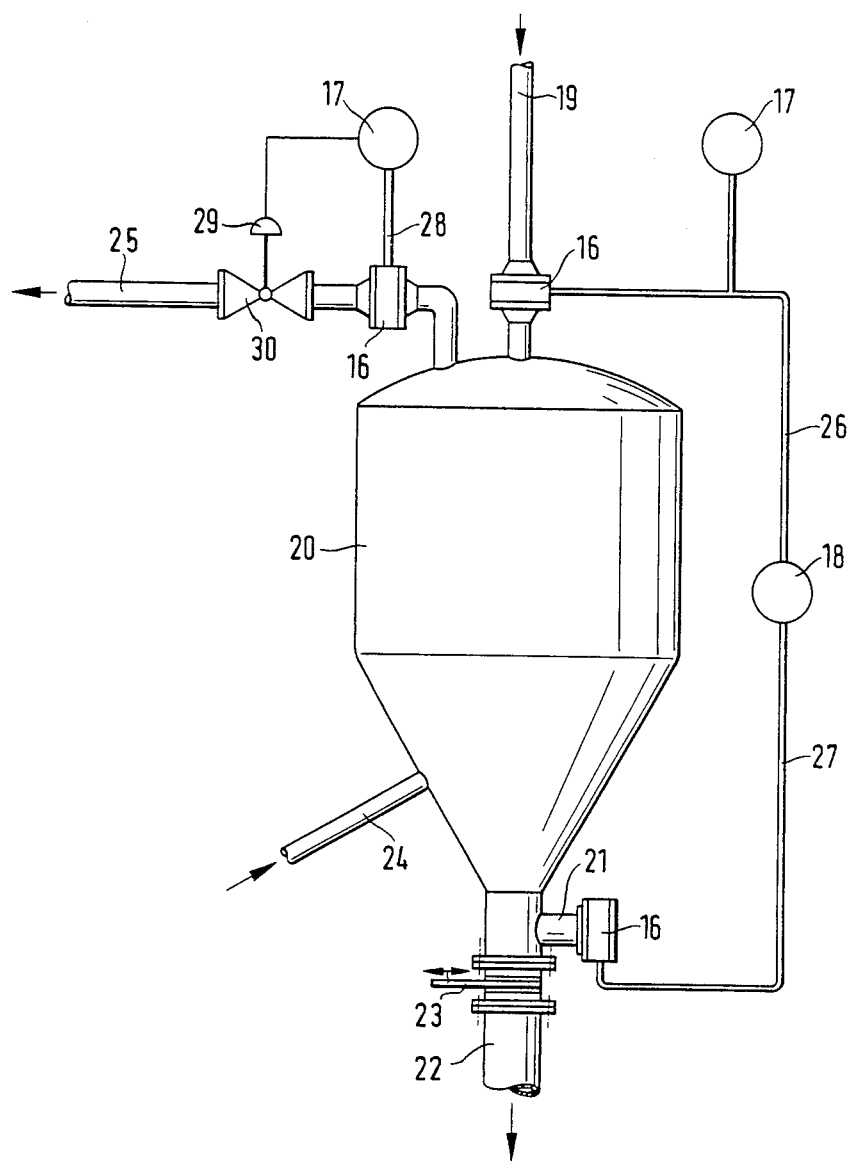
FIG. 4 is a substantially simplified side elevational view of a container utilizing the arrangement of FIG. 1.

FIG. 4 illustrates, as a further possibility of utilizing the arrangement of the present invention, the use of such an arrangement for pressure or pressure differential measurement at a container (storage bin) 20 for pulverulent to finely granular particulate materials. The particulate material which is to be stored in the storage bin 20 is introduced from above into the interior of the container 20 in the form of a gas/particulate medium stream supplied through a conduit 19, is stored in the interior of the container 20 and, as the need for such material arises, is withdrawn from the interior of the container 20 through a conduit 22. For controlling such withdrawal, a shut-off valve 23 is provided at the outlet of the container 20. Inasmuch as it is desired to maintain the pressure inside the container 20 at a constant level in this case of application of the present invention, rinsing gas is being blown from below into the interior of the container 20 through a rinsing gas conduit 24 as soon as the pressure inside the container 20 diminishes due to the withdrawal of the particulate material therefrom. In order to be able to discharge excessive rinsing gas out of the interior of the container 20, there is further provided a discharge conduit 25 at the upper part of the container 20. Herein, the arrangement 16 of the present invention is installed or interposed in each of the conduits 19 and 25. Another arrangement 16 is mounted on a flange 21 which is arranged at the outlet portion or end of the container 20 upstream of the shut-off valve 23.

In this construction, the pressure pulses taken from the conduit 19 are supplied from the respective arrangement 16 through a pulse conduit 26 to the pressure measuring device 17 and to the pressure differential measuring device 18. Furthermore, pressure pulses taken from the arrangement 16 which is mounted on the flange 21 are also supplied, via another pulse conduit 27, to the differential pressure measuring device 18. The particulate material contents of the container 20 is controlled in dependence on the differential pressure reading or output obtained from the differential pressure measuring device 18. The arrangement 16 which is installed in the conduit 25 is also connected, via still another pulse conduit 2, with the pressure measuring device 17, so that a position-adjustment drive of a valve 30 arranged in the discharge conduit 25 can be controlled by means of a pressure-regulating circuit in response to an undesirable increase in the pressure prevailing in the interior of the container 20, in such a manner that, when the valve 30 is correspondingly open, gas can escape from the interior of the container 20 through the discharge conduit 25. As soon as the undesirably high pressure in the container 20 has been relieved to the level of an acceptable pressure, the valve 30 is again automatically closed.

The pressure measuring devices 17 and the pressure differential measuring devices 18 which have been illustrated in FIGS. 2 to 4 can be commercially available customary measuring devices of any kind of construction. The utilization of the arrangement 16 of the present invention is not tied to or dependent on the use of any particular measuring device in conjunction therewith.

Figure 5:
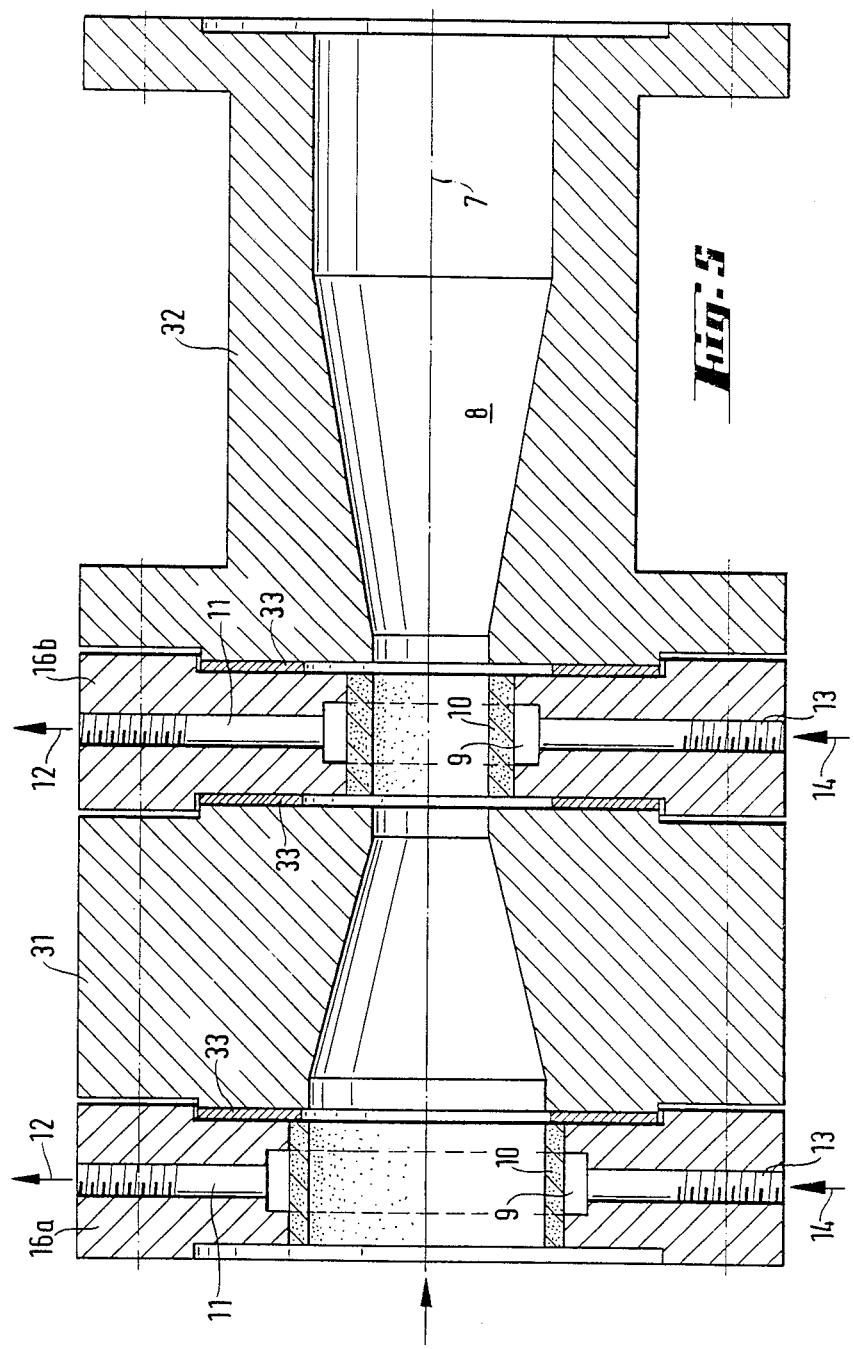
FIG. 5 is a sectional view of a Venturi tube incorporating the arrangement of FIG. 1.

Finally, FIG. 5 illustrates a sectional view of a Venturi tube which is assembled into its final configuration with the use of two arrangements 16a and 16b constructed in accordance with the present invention, and which can advantageously be used for taking differential pressure measurements. Herein, the Venturi tube is assembled from the arrangement 16a, an intermediate element 31, the arrangement 16b, and an end element 32. The individual components of the Venturi tube are coordinated with one another as far as their configurations are concerned. Respective sealing rings 33 provide for the gas and pressure tight sealing of the interfaces between the individual components. The construction of the arrangements 16a and 16b corresponds in each instance to the construction depicted in FIG. 1 of the drawing, so that corresponding reference numerals have been used to identify the same or corresponding parts.

The diameter of the flow passage 8 of each of the arrangements 16a and 16b is so dimensioned in each instance that, when the total picture is considered, there is obtained a flow channel which corresponds to the flow channel of a standard Venturi tube. In the illustrated construction, the arrangement 16a is arranged at the inlet end of the Venturi tube as considered in the flow direction indicated by an arrow in FIG. 5, while the arrangement 16b is arranged at the region at which the flow passage or channel 8 has its smallest diameter.

Of course, variants of the Venturi tube depicted in FIG. 5 are also possible and contemplated by the present invention, for instance such in which only one arrangement 16 of the present invention is being used. Depending on where the pressure pulse interception is to take place, the arrangement 16 of the present invention can be arranged either at the input end or at the output end of the Venturi tube or at the region of the smallest diameter of the flow channel of the Venturi tube.

It will be understood that each of the elements described above, or two or more together, may also find a useful application in other types of arrangements differing from the type described above.

While the invention has been illustrated and described as embodied in an arrangement for measuring pressure pulses occurring during the conveyance of gas/particulate material media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. An arrangement for monitoring pressure pulses in a flow of gas/particulate material flowing through an enclosed space, such as a pipeline, a container, and the like, comprising an annular metallic housing formed with a flow passage centered on an axis and connected to said enclosed space, an annular chamber surrounding said flow passage, and two connecting ports for respectively connecting said annular chamber with a pulse conduit and a rinsing conduit; and a barrier layer of a wear-resistant porous material fittingly received in said housing and circumferentially enclosing said flow passage to separate said annular chamber from said flow passage, said porous barrier layer establishing a continual pressure equalization between the gas/particulate material flowing through said enclosed space and said annular chamber and thus a connecting port connecting said annular chamber with said pulse conduit.

2. The arrangement as defined in claim 1, wherein said barrier layer is of a sintered metal.

3. The arrangement as defined in claim 1, wherein said barrier layer is of a ceramic material.

4. The arrangement as defined in claim 1, wherein said barrier layer is of a synthetic plastic material.

5. The arrangement as defined in claim 1, wherein said porous barrier layer has such a porosity that the cross-sectional areas of its pores is smaller than the average size of the particles of the medium.

6. The arrangement as defined in claim 1, wherein said flow passage has a circular cross section.

* * * * *